United States Patent
Peng et al.

(10) Patent No.: US 8,303,929 B2
(45) Date of Patent: Nov. 6, 2012

(54) PROCESS FOR PRODUCING A HYDROGEN-CONTAINING PRODUCT GAS

(75) Inventors: Xiang-Dong Peng, Orefield, PA (US); Diwakar Garg, Emmaus, PA (US); William Robert Licht, Allentown, PA (US); Shankar Nataraj, Allentown, PA (US); Peter de Geest, Williamsburg, NM (US); Eric S. Wagner, La Canada, CA (US)

(73) Assignees: Air Products and Chemicals, Inc., Allentown, PA (US); Technip USA, Inc., Claremont, CA (US)

( * ) Notice: Subject to any disclaimer, the term of this patent is extended or adjusted under 35 U.S.C. 154(b) by 273 days.

(21) Appl. No.: 12/760,583

(22) Filed: Apr. 15, 2010

(65) Prior Publication Data

US 2010/0264373 A1    Oct. 21, 2010

Related U.S. Application Data (60) Provisional application No. 61/169,345, filed on Apr. 15, 2009.

(51) Int. Cl.
*C01B 3/24* (2006.01)
*C01B 3/38* (2006.01)
(52) U.S. Cl. ........................ 423/650; 252/373
(58) Field of Classification Search .............. 252/373; 423/650
See application file for complete search history.

(56) References Cited

U.S. PATENT DOCUMENTS

| | | | |
|---|---|---|---|
| 5,752,995 A | 5/1998 | Kang | |
| 6,527,980 B1 | 3/2003 | Roden et al. | |
| 6,818,028 B2 | 11/2004 | Barnett et al. | |
| 7,087,192 B2 | 8/2006 | Rostrup-Nielsen et al. | |
| 7,449,167 B2 | 11/2008 | Garg et al. | |
| 2007/0027220 A1* | 2/2007 | Lattner | 518/726 |
| 2008/0069766 A1 | 3/2008 | Rojey et al. | |
| 2008/0315158 A1* | 12/2008 | Cambra Ibanez et al. | 252/373 |

FOREIGN PATENT DOCUMENTS

| | | |
|---|---|---|
| BE | 645239 A | 7/1964 |
| EP | 1241130 A1 | 9/2002 |
| EP | 1403215 A1 | 3/2004 |
| EP | 1403217 A1 | 3/2004 |

(Continued)

OTHER PUBLICATIONS

S. Littlewood, T. Gamlin and M. Linchwaite, "Prereforming: Based on higher activity catalyst to meet market demands", Ammonia Technical Manual, Kvaerner Process Technology Ltd, 2000.

(Continued)

*Primary Examiner* — Melvin C Mayes
*Assistant Examiner* — Kenneth Vaden
(74) *Attorney, Agent, or Firm* — McNees Wallace & Nurick LLC (57) ABSTRACT

A process for producing a hydrogen-containing product gas by catalytic steam-hydrocarbon reforming with an overall steam-to-carbon molar ratio between 1.5 and 2.4 for the process. The process stream is reacted in at least two prereformers prior to reaction in catalyst-containing tubes in a top-fired reformer furnace. The process stream is reacted adiabatically in the first prereformer, while the process stream is heated prior to being introduced into the second prereformer and/or the second prereformer is heated. The process avoids carbon formation on the catalyst in the catalyst-containing tubes in the primary reformer.

20 Claims, 3 Drawing Sheets

FOREIGN PATENT DOCUMENTS

| | | |
|---|---|---|
| EP | 1616838 A3 | 11/2007 |
| EP | 1734002 A3 | 9/2008 |
| JP | 2001146406 A | 5/2001 |

OTHER PUBLICATIONS

T. S. Christensen, "Adiabatic Prereforming of Hydrocarbons—An Important Step in Syngas Production," Appl. Catal. A: General 138 (1996) 285-309.

Ib Dybkjær, "Tubular Reforming and Autothermal Reforming of Natural Gas—Overview of Available Processes," Fuel Processing Technology 42 (1995) p. 93-95.

J. R. Rostrup-Nielsen and J. H. Bak Hensen, "CO2 reformer of methane over transition metals", J. Catalysis 144 (1993) p. 38-49.

D. N. Clark, W. G. S. Henson, "Opportunities for Savings with Pre-Reforming", Ammonia Symposium, Minneapolis, Minnesota 1987.

Zanno et al., "Hydrogen Manufacturing Plant with CO2 Recovery and PSA Purification; Design and Operating Exerience," ERTC 10th Annual Meeting, Vienna, Austria (2005).

* cited by examiner

PROCESS FOR PRODUCING A HYDROGEN-CONTAINING PRODUCT GAS

BACKGROUND

The present invention relates to a process for producing a hydrogen-containing gas by steam/hydrocarbon reforming and more particularly to a process where the overall steam-to-carbon molar ratio is below 2.5.

Hydrogen production by steam/hydrocarbon reforming, also called steam-methane reforming or SMR, is well-known. The process is an energy intensive process.

As energy costs rise, the hydrogen production industry has been driven to improve the thermal efficiency of the reforming process. Those skilled in the art recognize that the thermal efficiency improves when the overall steam-to-carbon molar ratio is reduced. Lower steam-to-carbon ratios reduce the waste heat loss from the reforming process and thereby enhance thermal efficiency. Industry has been successful reducing the steam-to-carbon molar ratio from about 3.0, which was conventionally used, to a value as low as 2.5.

One of the technical barriers for lowering the steam-to-carbon ratio is associated with downstream processing in a shift reactor, particularly where an iron-based high temperature shift catalyst is used. The shift reaction is used to convert the carbon monoxide in the reformer effluent with steam to produce more hydrogen. When the steam-to-carbon molar ratio is lower than about 2.8, the iron in the high temperature shift catalyst will be reduced to its lowest oxidation state. The reduced high temperature shift catalyst will catalyze undesired reactions such as converting hydrogen and carbon monoxide to hydrocarbons. Further, the reduced catalyst will lose its mechanical strength, causing the collapse of the catalyst bed and inoperable pressure drop through the catalyst bed.

This technical barrier has been overcome by using a copper-based medium temperature shift catalyst, which is insensitive to the overall steam-to-carbon molar ratio for the reforming process. Using a copper-based medium temperature shift catalyst, the steam-to-carbon molar ratio may be reduced below 2.5 without problems in the shift reactor.

As the steam-to-carbon molar ratio was lowered, industry experienced another technical barrier to decreasing the steam-to-carbon molar ratio. At steam-to-carbon molar ratios less than 2.5, carbon (coke or soot) would form on the reforming catalyst in the catalyst-containing reformer tubes in a top-fired reformer. Carbon formation deactivates and/or disintegrates the reforming catalyst, causing undesired pressure drop through the reformer tubes and/or overheating of the tubes. If the catalyst is deactivated and/or disintegrated, hydrogen production must be interrupted in order to regenerate or replace the catalyst.

Industry has handled this potential problem by recycling carbon dioxide and reducing the heat flux. However, carbon dioxide recycle is antithetical to hydrogen production. Reduced heat flux operation directly translates to increased number and/or length of expensive high alloy tubes in the reformer.

Carbon formation is affected by the temperature of the reforming catalyst in the fired reformer. The higher the temperature, the more severe the carbon formation. Since the catalyst is located inside the reformer tubes, the catalyst temperature is often expressed as the tube wall temperature. It is well known that top-fired reformers are more prone to carbon formation than side-fired reformers [T. S. Christensen, *Applied Catalysis A: General* 138 (1996) pages 285-309, Elsevier Science B.V.]. This is due to higher heat fluxes in the entrance section resulting in the higher tube wall temperatures thereby promoting carbon formation. As a result, no SMR processes using the top-fired reformer has used or been taught to use an overall steam-to-carbon ratio of less than 2.5.

Industry desires to improve the thermal efficiency of steam/hydrocarbon reforming processes. Industry desires a hydrogen production process using a steam/hydrocarbon reformer that can operate at high heat fluxes, but at efficiencies afforded by S/C operation below 2.5, and without the risk for carbon deposition.

BRIEF SUMMARY

The present invention relates to a process for producing a hydrogen-containing product gas. The process comprises:
(a) introducing a process stream comprising steam and at least one hydrocarbon selected from the group consisting of methane, ethane, propane, butane, pentane and hexane into a first reactor containing a first reforming catalyst, the process stream having an initial molar flow rate of steam, $F_s$, and a initial molar flow rate of hydrocarbon-based carbon, $F_C$, the steam being provided in the process stream, in one or more steam-containing streams, or in a combination of the process stream and the one or more steam-containing streams, to provide a steam-to-carbon molar ratio, S/C, of between 1.5 to 2.4;
(b) introducing the one or more steam-containing streams, when present, into the process stream, the one or more steam-containing streams having a molar flow rate of steam, $W_s$, ranging from 0 to $5F_s$, and having a molar flow rate of methane-based carbon, $W_C$, ranging from 0 to $1F_c$ to provide the steam-to-carbon molar ratio, S/C, where $$\frac{S}{C} = \frac{F_s + W_s}{F_C + W_C}$$

(c) reacting the at least one hydrocarbon and steam in the process stream in the presence of the first reforming catalyst under adiabatic conditions at a first temperature ranging from 425° C. to 600° C. and a first pressure ranging from 5 to 55 atmospheres to form reaction products comprising hydrogen and carbon dioxide in the process stream;
(d) heating the process stream to a second temperature ranging from 425° C. to 730° C.;
(e) reacting methane and steam in the process stream in the presence of a second reforming catalyst in a second reactor at the second temperature ranging from 425° C. to 730° C. and a second pressure ranging from 4 to 55 atmospheres to form additional reaction products comprising hydrogen and carbon dioxide in the process stream;
(f) withdrawing the process stream from the second reactor at an exit temperature ranging from 510° C. to 730° C.
(g) subsequent to withdrawing the process stream from the second reactor, introducing the process stream comprising methane and steam into a plurality of catalyst-containing reformer tubes in a reformer furnace having a ceiling, a floor and side walls, and reacting methane and steam in the process stream inside the plurality of catalyst-containing reformer tubes at a third temperature ranging from 500° C. to 1000° C. and a third pressure ranging from 2 to 50 atmospheres to form the hydrogen-containing product gas; and
(h) combusting a fuel gas in the reformer furnace external to the plurality of catalyst-containing reformer tubes by introducing the fuel gas and an oxidant gas through burners mounted in the ceiling of the reformer furnace to supply energy for reacting methane and steam inside the plurality of catalyst-containing reformer tubes, and withdrawing a flue gas from the reformer furnace.

In certain embodiments, the reacting step (d) may be performed subsequent to the heating step (c). Alternatively, the reacting step (d) is simultaneous with the heating step (c).

The burners may be mounted only in the ceiling of the reformer furnace to generate flames in a direction co-current with the process stream in the plurality of catalyst-containing reformer tubes.

The temperature of the process stream exiting the second reactor may range from 510° C. to 640° and the process may further comprise heating the process stream by at least 10° C. to an inlet temperature ranging from 560° C. to 650° C. prior to introducing the process stream comprising methane and steam into the plurality of catalyst-containing reformer tubes.

The first reforming catalyst may comprise 30 weight % to 50 weight % of at least one metal selected from a group consisting of nickel, cobalt, and mixtures thereof and a first support comprising 50 weight % to 70 weight % of at least one of alumina and calcium aluminate. The first reforming catalyst may be promoted by potassium. Alternatively, the first support may be a structured support. The first reforming catalyst may further comprise 0.5 weight % to 3 weight % potassium.

The second reforming catalyst may comprise 10 weight % to 20 weight % of at least one metal selected from a group consisting of nickel, cobalt, and mixtures thereof and a second support. The second support may be a refractory support comprising at least one of alumina, calcium aluminate, and magnesium aluminate. Alternatively, the second support may be a structured support. The second reforming catalyst may be promoted by potassium.

The second reforming catalyst may be the same as the first reforming catalyst or the second reforming catalyst and the first reforming catalyst may be different.

In certain embodiments, the process stream entering the catalyst tubes of the reformer may have a mole fraction ratio, R, that satisfies the following equation:

$$R < 0.327 * \left(\frac{S}{C}\right)^{2.354}.$$

In another embodiment, the steam-to-carbon molar ratio is between 2.0 and 2.2. The first reforming catalyst and the second reforming catalyst comprise 30 weight % to 50 weight % of at least one metal selected from a group consisting of nickel, cobalt, and mixtures thereof and the reacting step (e) is subsequent to the heating step (d).

In another embodiment, the steam-to-carbon molar ratio, S/C, is between 1.8 and 2.0. The first reforming catalyst comprises 30 weight % to 50 weight % of at least one metal selected from a group consisting of nickel, cobalt, and mixtures thereof, the second reforming catalyst comprises 10 weight % to 20 weight % of at least one metal selected from a group consisting of nickel, cobalt, and mixtures thereof, and the reacting step (e) is subsequent to the heating step (d).

In another embodiment, the steam-to-carbon molar ratio, S/C, is between 1.5 and 1.8. The first reforming catalyst comprises 30 weight % to 50 weight % of at least one metal selected from a group consisting of nickel, cobalt, and mixtures thereof, and the second reforming catalyst comprises 10 weight % to 20 weight % of at least one metal selected from a group consisting of nickel, cobalt, and mixtures thereof and the reacting step (e) is simultaneous with the heating step (d).

Other features and advantages of the present invention will be apparent from the following more detailed description of the preferred embodiment, taken in conjunction with the accompanying drawings which illustrate, by way of example, the principles of the invention.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The phrase "at least a portion" means "a portion or all."

As used herein, "plurality" means at least two.

For the purposes of simplicity and clarity, detailed descriptions of well-known devices, circuits, and methods are omitted so as not to obscure the description of the present invention with unnecessary detail.

The present invention provides a system and method that improves the thermal efficiency of steam/hydrocarbon reforming processes, and a system and method for hydrogen production process using a steam/hydrocarbon reformer that can operate at high heat fluxes, but at efficiencies afforded by S/C operation below 2.5, with little or no carbon deposition.

The present invention relates to a process for producing a hydrogen-containing product gas. More specifically, this process relates to a process for producing hydrogen using overall steam-to-carbon ratio of 1.5 to 2.4 without carbon formation on the reforming catalyst in the catalyst-containing tubes in a top-fired reformer. The hydrogen-containing product gas may be an intermediate process gas within a larger process. The hydrogen-containing product gas may also comprise at least one of carbon monoxide, carbon dioxide, and unreacted feed.

The hydrogen-containing product gas may be further processed to form a pure or substantially pure hydrogen product.

The process will be described with reference to FIG. 1 and FIG. 2, wherein like reference numbers refer to like elements.

The process comprises introducing a process stream 10 comprising steam and at least one hydrocarbon selected from the group consisting of methane, ethane, propane, butane, pentane and hexane into reactor 101 containing reforming catalyst 102. The process stream 10 may contain one or more hydrocarbons and may contain small amounts of other components. The process stream may be formed from natural gas and steam. The process stream 10 may be formed from naphtha and steam and/or liquefied petroleum gas (LPG) and steam and/or refinery fuel gas (RFG) and steam or other feedstock known in the art. Reactor 101 may be a so-called "prereformer" and may be of any suitable design and construction known in the art.

Prior to being fed to reactor 101, the process stream 10 may be treated in a desulfurization unit (not shown) to remove sulfur, which is known to poison nickel-based catalysts used in prereformers. It is desirable to reduce the sulfur content of the process feed 10 to the prereformer to a level below about 100 ppb, and more preferably below about 50 ppb or less than about 30 ppb. Hydrogen may be present in the process stream 10, for example, in an amount sufficient to maintain catalyst in its reduced state. The amount of hydrogen in the process stream 10 is preferably more than 0.2%.

Reforming catalyst 102 may be any suitable reforming catalyst known in the art for so-called "prereforming." Prereforming is a term used to describe reforming before the main reforming step, for example in a fired reformer. Catalysts for prereforming are commercially available.

Reforming catalyst 102 may comprise at least one metal selected from a group consisting of nickel, cobalt, platinum, palladium, rhodium, ruthenium, iridium and mixtures thereof.

Reforming catalyst 102 may be a supported catalyst. As used herein, the term "catalyst" comprises the catalytically active component as well as any support material. The catalyst may be microporous, have a high nitrogen BET surface area, and have a high content of nickel, cobalt or mixtures thereof.

The reforming catalyst 102 in pellet form may be made from a powder that is produced by co-precipitating nickel, cobalt or mixtures thereof, and alumina or nickel and alumina or calcium aluminate together. A co-precipitated catalyst is a catalyst without a separate support. The catalyst may contain nickel as elemental Ni and/or cobalt as elemental Co in an amount from about 30 weight % to about 50 weight %. The alumina and/or calcium aluminate content may be from about 50 weight % to about 70 weight %. The catalyst may be promoted with potassium in an amount from about 0.5 weight % to about 3 weight %. The catalyst pellet may have a nitrogen BET area from about 50 to 200 $m^2/g$.

First reforming catalyst 102 suitable for prereforming are discussed in U.S. Pat. No. 4,105,591, U.S. Pat. No. 3,882,636, U.S. Pat. No. 3,988,425, GB 969,637, GB 1,150,066, and GB 1,155,843, which are hereby incorporated by reference in their entirety.

The second reforming catalyst 104 may be the same as the first reforming catalyst 102. If the first reforming catalyst 102 and the second reforming catalyst 104 are not the same, the second reforming catalyst 104 may be based on nickel, cobalt, platinum, palladium, rhodium, ruthenium, iridium and mixtures thereof may be microporous, have a high nitrogen BET surface area, and have a low metal content. The catalyst support in pellet form is prepared from powder of alumina, calcium aluminate, magnesium aluminate or mixtures thereof. The metal or a combination of metals are then impregnated by a wet impregnation technique onto the support. The catalyst may contain nickel, cobalt or a combination of these metals from about 5 to 20 weight %, preferably from about 10 to 20 weight %. The catalyst may contain platinum, palladium, rhodium, ruthenium, iridium metal or a combination of these metals from about 0.1 to 3 weight %, preferably from about 0.5 to 3 weight %. The catalyst may be promoted with potassium in an amount from about 0.5 weight % to about 3 weight %. The catalyst pellet may have a nitrogen BET area from about 5 to about 50 $m^2/g$.

Reforming catalysts 102 and 104 may be in a wide variety of shapes or forms, for example cylindrical pellets, Raschig rings, multi-hole shaped catalyst, etc. or other form known in the art. The catalyst size may range from about 1 mm to about 15 mm in diameter. The length of the catalyst may range from about 3 mm to 10 mm. The ideal size for a given application depends on a number of factors including the catalyst shape and nickel loading, the operating temperature, pressure, and feed composition, and the allowable pressure drop. A catalyst with a multi-hole shape with a diameter in the range from 5 mm to 25 mm and a height to diameter ratio of 0.5 to 1.2 will be suitable for reforming catalyst 102. One skilled in the art is able to select suitable catalyst with a suitable shape for reforming catalyst 102.

Reforming catalysts 102 and 104 may also be structured packing catalyst where the catalyst is applied as a washcoat on a structured packing. Structured packing is known in the art. As used herein, the term "structured packing" means a flow guide having a plurality of substantially parallel passages. Substantially parallel means parallel within manufacturing tolerances. Davidson, U.S. Pat. No. 4,340,501, which is hereby incorporated by reference in its entirety, describes a structure in a reactor vessel where the fluid is intermittently but controllably brought into contact with the vessel walls.

Process stream 10 has an initial molar flow rate of steam, $F_s$, and an initial molar flow rate of hydrocarbon-based carbon, $F_C$. The molar flow rate of steam is the molar flow rate of the steam component in the process stream 10. For example, if the total molar flow rate of process stream 10 is 100 moles/h and the mole fraction of steam in process stream 10 is 0.5, the molar flow rate of steam is 50 moles/h. The "initial" molar flow rate of steam in the process stream 10 is the molar flow rate of steam before introducing the process stream 10 into reactor 101.

The molar flow rate of hydrocarbon-based carbon is the molar flow rate of carbon where the carbon is associated with hydrocarbons (i.e. excluding carbon associated with carbon monoxide and carbon dioxide). For example, if the total molar flow rate of process stream 10 is 100 moles/h, and the mole fraction of methane is 0.35, the mole fraction of ethane is 0.1, and the mole fraction of carbon monoxide is 0.05, then the molar flow rate of hydrocarbon-based carbon is 55 moles/h. Methane contributes 35 moles/h of hydrocarbon based carbon. Ethane contributes 20 moles/h of hydrocarbon-based carbon. And carbon monoxide contributes zero moles/h of hydrocarbon based carbon. The "initial" molar flow rate of hydrocarbon-based carbon in the process stream 10 is the molar flow rate of hydrocarbon-based carbon before introducing the process stream 10 into reactor 101.

The initial fraction of carbon dioxide in process stream 10 may be less than 10 mole %. The "initial" mole fraction in process stream 10 is the mole fraction before introducing the process stream 10 into reactor 101.

The process further comprises optionally introducing one or more steam-containing streams 20, 22, 24 into the process stream 12, 14, 16. The optional one or more steam-containing streams may include other components, for example, hydrocarbons. As shown, the optional one or more steam-containing streams may be introduced into the process stream at any point along the process. As used herein, the "process stream" includes the stream as it moves from the inlet to reactor 101 to the exit from the plurality of catalyst-containing reformer tubes 107, where it is called the hydrogen-containing product gas 60.

The optional one or more steam-containing streams 20, 22, 24 have a molar flow rate of steam, $W_s$, ranging from 0 to 5 $F_s$. The optional one or more steam-containing streams 20, 22, 24 have a molar flow rate of methane-based carbon, $W_C$, ranging from 0 to 1$F_C$. The molar flow rate of steam and/or methane-based carbon may take a value of zero since the streams are optional. Since these optional streams are not fully processed in both of the reactors, it would be undesirable to introduce higher hydrocarbons in the optional one or more steam-containing streams.

The molar flow rates $F_s$, $W_s$, $F_c$ and $W_c$ may be used to define an overall steam-to-carbon molar ratio, S/C, for the process. The steam-to-carbon molar ratio, $$\frac{S}{C} = \frac{F_s + W_s}{F_C + W_C}.$$

For the process, $$1.5 < \frac{S}{C} < 2.4.$$

In another embodiment, the process includes an S/C ratio satisfying the following equation:

$$2.0 < \frac{S}{C} < 2.2.$$

In still another embodiment, the process includes an S/C ratio satisfying the following equation:

$$1.8 < \frac{S}{C} < 2.0.$$

In still another embodiment, the process includes an S/C ratio satisfying the following equation:

$$1.5 < \frac{S}{C} < 1.8.$$

The process may include introducing a process stream 10 comprising steam and at least one hydrocarbon selected from the group consisting of methane, ethane, propane, butane, pentane and hexane into a first reactor 101 containing a first reforming catalyst 102, the process stream 10 having an initial molar flow rate of steam, $F_s$, and a initial molar flow rate of hydrocarbon-based carbon, $F_C$. The steam is provided in the process stream 10, to provide a steam-to-carbon molar ratio, S/C, of between 1.5 to 2.4.

Alternatively, the process may include introducing a process stream 10 comprising steam and at least one hydrocarbon selected from the group consisting of methane, ethane, propane, butane, pentane and hexane into a first reactor 101 containing a first reforming catalyst 102. The process stream 10 includes an initial molar flow rate of steam, $F_s$, and a initial molar flow rate of hydrocarbon-based carbon, $F_C$. In addition, the process may include introducing one or more steam-containing streams 20, 22, 24 into the process stream 12, 14, 16, the one or more steam-containing streams 20, 22, 24 having a molar flow rate of steam, $W_s$, ranging from 0 to $5F_s$, and having a molar flow rate of methane-based carbon, $W_C$, ranging from 0 to $1F_C$, wherein a steam-to-carbon molar ratio, S/C, of between 1.5 to 2.4 is formed, where $$\frac{S}{C} = \frac{F_s + W_s}{F_C + W_C}.$$

The process further comprises reacting the at least one hydrocarbon and steam in the process stream 10 in the presence of reforming catalyst 102 under adiabatic conditions at a first temperature ranging from 425° C. to 600° C. and a first pressure ranging from 5 to 55 atmospheres to form reaction products comprising hydrogen and carbon dioxide in the process stream 12. In the case of C2 to C6 hydrocarbons are in the initial process stream 10, the reaction products will include methane. The process stream 12 is withdrawn from reactor 101. As used herein, conditions are adiabatic if the actual temperature change is within 10% of that associated with a theoretical adiabatic system, i.e. no heat transfer. For example, an endothermic reaction that causes a 100° C. drop in the stream temperature would be considered adiabatic if the incidental duty caused no more than a ±10° C. deviation from this adiabatic temperature change, i.e., temperature changes from 90 to 110° C. would still be considered adiabatic.

The process further comprises heating the process stream 12 to a second temperature ranging from 425° C. to 730° C. Simultaneous with and/or subsequent to heating, the process comprises reacting methane and steam in the process stream 12, 14 in the presence of reforming catalyst 104 in reactor 103 at the second temperature ranging from 425° C. to 730° C. and a second pressure, P, ranging from 4 to 55 atmospheres to form additional reaction products comprising hydrogen and carbon dioxide in the process stream 16. The term "and/or" includes the possibilities that the heating and reacting may be simultaneous, the reacting may be subsequent to the heating, and the heating may occur before and during the reacting.

Figure 1:
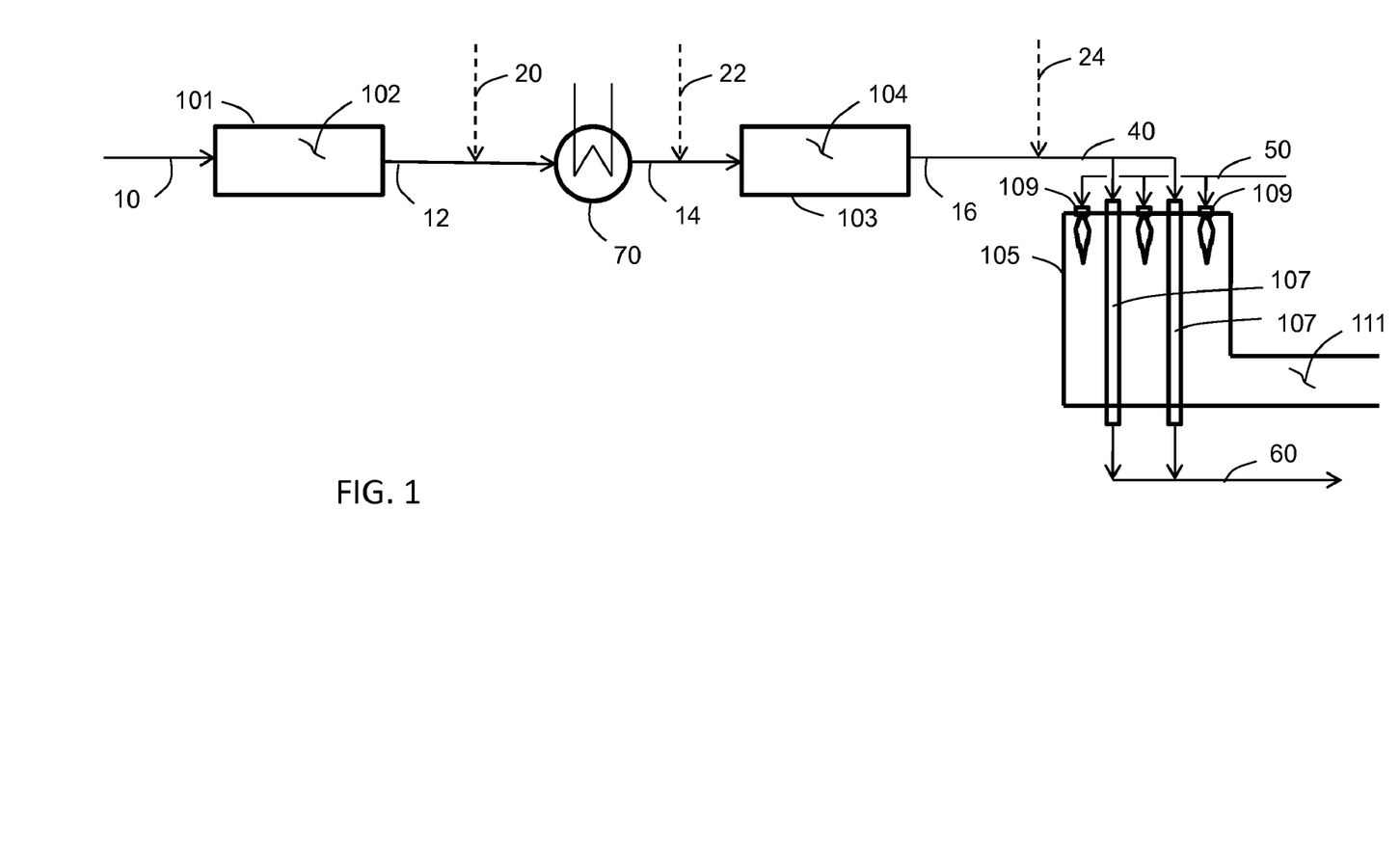
FIG. 1 is a process flow diagram for a process for producing a hydrogen-containing product gas.

As shown in FIG. 1, the process stream 12 may be heated in a heat exchanger 70 and subsequently reacted in reactor 103. In this case, reactor 103 may be an adiabatic reactor.

Figure 2:
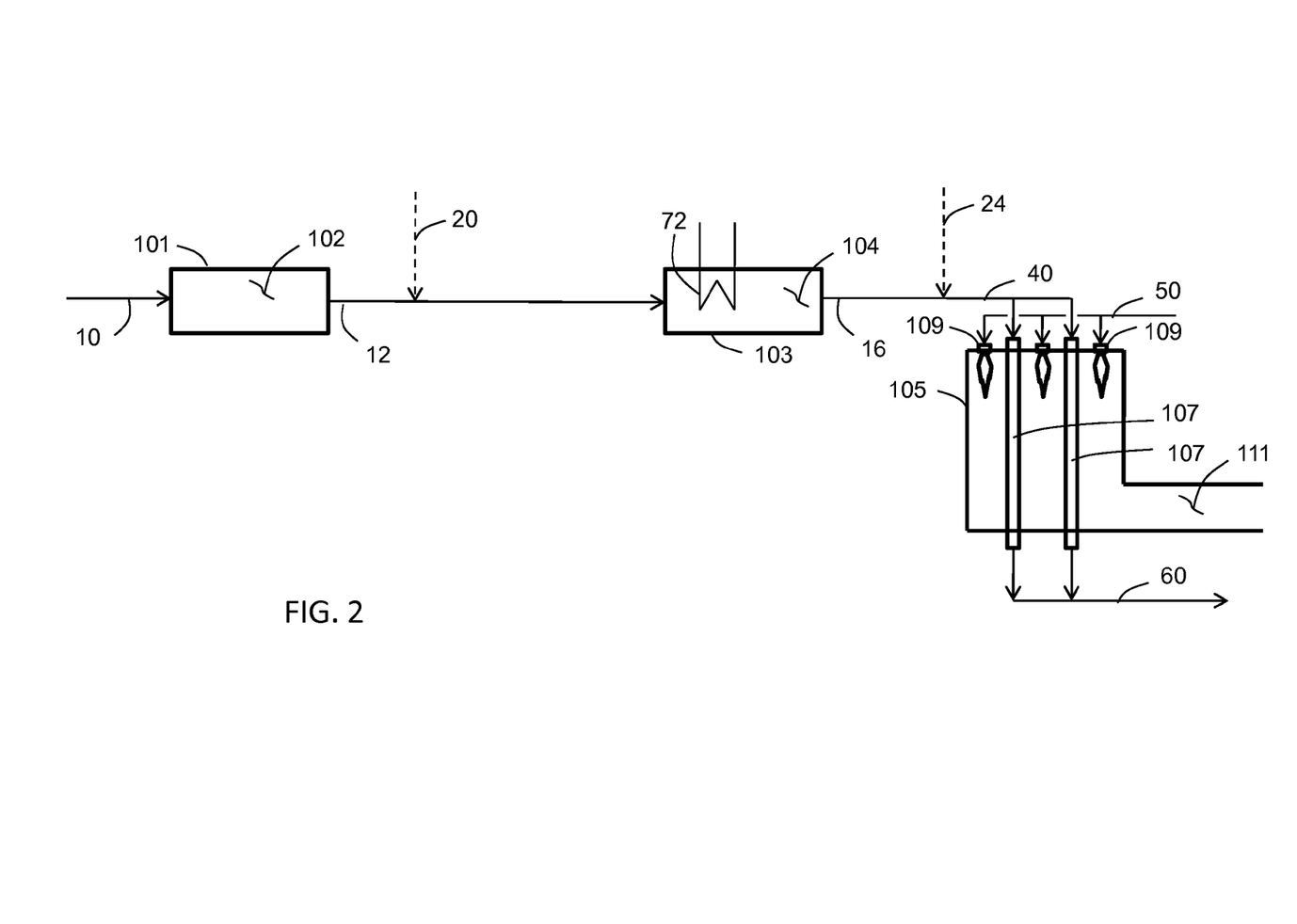
FIG. 2 is a process flow diagram for a process for producing a hydrogen-containing product gas.

As shown in FIG. 2, the process stream 12 may be heated with a heat exchanger 72 and reacted in reactor 103. In this case, reactor 103 is a non-adiabatic reactor wherein heat exchanger 72 provides heat to the reactor 103. Reactor 103 may be any of the various types of non-adiabatic reactors known in the art in which heat is supplied by integration with a high temperature process stream or with high temperature combustion gases downstream of the reformer furnace.

In another embodiment, the process stream 12 may be heated in a heat exchanger and also further heated and reacted in reactor 103 (not shown).

The heat exchanger 70 and reactor 103 may be of any suitable design and construction known in the art.

Reforming catalyst 104 may be any suitable reforming catalyst known in the art for steam/hydrocarbon reforming. Reforming catalyst 104 may comprise at least one metal selected from a group consisting of nickel, cobalt, platinum, palladium, rhodium, ruthenium, iridium and mixtures thereof.

Reforming catalyst 104 may be the same as reforming catalyst 102 and may have similar geometric features. The catalyst supports may be pellets made of high temperature stable alumina, calcium aluminate, and/or magnesium aluminate. The support pellets may be prepared by mixing powder alumina, calcium aluminate, and/or magnesium aluminate with a pore former, pressing powder into the desired shape and then calcining. The pellets may be impregnated with nickel, cobalt or a mixture thereof by a wet impregnation technique to provide an amount of NiO or CoO ranging from about 10 weight % to 20 weight %. The NiO or CoO would be reduced to elemental Ni or Co before use as reforming catalyst. The catalyst pellet may be microporous or macroporous or a combination thereof. The pellets may have a normal bell-shape type pore size distribution or may have dual pore size distribution. The catalyst pellet may have a nitrogen BET surface area ranging from 5 to 50 m²/g. The catalyst may be promoted with potassium in an amount ranging from about 0.2 weight % to 3 weight %.

Reforming catalyst 104 based on platinum, palladium, rhodium, ruthenium, iridium and mixtures thereof may be microporous, have a high nitrogen BET surface area, and have a low metal content. The catalyst support in pellet form is prepared from powder of alumina, calcium aluminate, magnesium aluminate or mixtures thereof. The metal or a combination of metals are then impregnated onto the support. The catalyst may contain platinum, palladium, rhodium, ruthenium, iridium metal or a combination of these metals from about 0.1 to 3 wt %, preferably from about 0.5 to 3 wt %.

One skilled in the art can select a suitable reforming catalyst 104. Examples include a non-potassium promoted, macroporous nickel catalyst with dual pore size distribution, as described in EP 1 241 130A, which is hereby incorporated by reference in its entirety. Another example of a suitable catalyst includes potassium promoted, macroporous nickel catalyst with dual pore size distribution, as described in U.S. Pat. No. 7,449,167, which is hereby incorporated by reference in its entirety. Other suitable nickel catalysts include those described in U.S. Pat. No. 4,990,481, U.S. Pat. No. 5,773,589 and U.S. Pat. No. 4,707,351, which are hereby incorporated by reference in their entirety.

Reforming catalyst 104 may also be structured packing catalyst where the catalyst is applied as a washcoat on a structured packing.

The process further comprises withdrawing the process stream 16 from reactor 103 at an exit temperature ranging from 510° C. to 730° C. To achieve this exit temperature, the process stream will have been sufficiently heated in heat exchanger 70 and/or reactor 103.

The process stream 16 may optionally be heated in a heat exchanger after being withdrawn from reactor 103. The exit temperature from reactor 103 may range from 510° C. to 640° C. and the process may optionally comprise heating the process stream by at least 10° C. to a temperature ranging from 560° C. to 650° C.

Subsequent to withdrawing the process stream 16 from reactor 103, the process comprises introducing the process stream 40 comprising methane and steam into a plurality of catalyst-containing reformer tubes 107 in a reformer furnace 105. The catalyst-containing reformer tubes 107 are substantially vertical (i.e. parallel with the earth's gravity). The reformer furnace 105 has a ceiling, a floor and side walls. By reacting methane and steam in reactor 101 and reactor 103, the methane and other hydrocarbons in process stream will have been sufficiently converted to avoid carbon formation in the catalyst-containing reformer tubes 107.

Reformer furnaces with a plurality of catalyst-containing reformer tubes, i.e. tubular reformers, are well known in the art. Suitable materials and methods of construction are known. Catalyst in the catalyst-containing reformer tubes may be any suitable catalyst known in the art, for example, a supported catalyst comprising nickel. The catalyst used in the catalyst-containing reformer tubes may be the same or similar to the catalyst 104.

Methane and steam in the process stream 40 are reacted inside the plurality of catalyst-containing reformer tubes 107 at a third temperature ranging from 500° C. to 1000° C. and a third pressure ranging from 2 to 50 atmospheres to form the hydrogen-containing product gas 60. The hydrogen-containing product gas 60 is withdrawn from the plurality of catalyst-containing reformer tubes 107.

The process further comprises combusting a fuel gas 50 in the reformer furnace 105 external to the plurality of catalyst-containing reformer tubes 107 by introducing the fuel gas and an oxidant gas through burners 109 mounted in the ceiling of the reformer furnace 105. A reformer furnace with burners mounted in the ceiling is often referred to as a "top-fired" reformer. In certain embodiments, the burners 109 may be mounted only in the ceiling of the reformer furnace. Process gas in the plurality of catalyst-containing reformer tubes moves from the top of the reformer furnace to the bottom of the reformer furnace. Consequently, the process gas and the flame and/or combustion products move co-currently to one another. The highest temperature from the flame will be near the top portion of the reformer furnace.

The fuel gas may be any suitable fuel gas known in the art, for example, waste gas from a pressure swing adsorber (PSA) and/or refinery fuel gas, and/or natural gas. The oxidant gas may be any suitable oxidant gas known in the art, for example, air.

The combustion of the fuel gas with oxidant gas provides energy for reacting methane and steam inside the plurality of catalyst-containing reformer tubes 107. Combustion products from combustion of the fuel gas with oxidant gas are withdrawn as a flue gas 111 from the reformer furnace 105. Heat may be recovered from the flue gas as is conventional in the art. The flue gas may be used to heat the process gas in the heat exchanger 70 and/or the reactor 103.

The process stream 40 entering catalyst-containing reformer tubes 107 will have a mole fraction ratio, R, where $$R = \frac{Y_{CH_4}}{(Y_{H_2} + 0.5 * Y_{CO_2})},$$

where $Y_{CH_4}$ is the mole fraction of methane in the process stream, $Y_{H_2}$ is the mole fraction of hydrogen in the process stream, and $Y_{CO_2}$ is the mole fraction of carbon dioxide in the process stream. The inventors have found that the mole fraction ratio of the stream introduced into the catalyst-containing tubes in a fired reformer provides an indication of the tendency for carbon formation on the reforming catalyst in the catalyst containing tubes.

Lower values of mole fraction ratio, R, correspond to a lower propensity for carbon formation on the catalyst in the reformer tubes. From an understanding of the carbon formation and carbon gasification kinetics and experience in designing the top-fired reformer, the inventors have established criteria to assess whether the reformer is at the risk of carbon formation based on the mole fraction ratio, R. The present process enables one to adjust the mole fraction ratio, R, for a given steam-to-carbon ratio so that the top-fired reformer operates at low steam-to-carbon ratio without carbon formation. The adjustment is achieved by varying the operating conditions of reactor 101 and/or reactor 103.

One example of the carbon formation criteria is Equation 1, below:

$$R < 0.327 * \left(\frac{S}{C}\right)^{2.354} \tag{1}$$

Equation 1 relates to a given set of reformer design parameters for a top-fired tubular reformer and the operating pressure of the prereformer 103 and the reformer tubes 107 around 40 atm. For a given steam-to-carbon ratio in the range of 1.5 to 2.4, when the mole fraction ratio, R, is less than that calculated from Equation (1), the risk of carbon formation on the reforming catalyst has been found by modeling to be minimal.

Different combinations of reactors and catalysts can be used to achieve a desired value of R that facilitates a predetermined value for S/C that is sufficiently low to provide desired operational efficiency. To obtain an optimum or desirable operational efficiency, the trade-off that exist between the benefits of reduced S/C and cost of the material required to achieve little or no carbon formation is balanced. For example, a value for R that is lower than what is needed for a target S/C may result in unnecessary expense.

In one embodiment, reactors 101 and 103 can both be adiabatic reactors. Catalysts 102 and 104 can both be known high nickel-containing prereforming catalysts. Reactor 101 can operate in a temperature range from 425 to 600° C. and reactor 103 can operate in a temperature range from 450 to 650° C. This combination of reactor and catalyst results in little or no carbon formation with an overall S/C is between 2.0 and 2.2 or higher.

In another embodiment, reactors 101 and 103 can both be adiabatic reactors. Reforming catalyst 102 can be a known high nickel-containing prereforming catalyst. Catalyst 104 can be a known low nickel-containing reforming catalyst. Reactor 101 can operate in a temperature range from 425 to 600° C. and reactor 103 can operate in a temperature range from 450 to 730° C. This combination of reactor and catalyst results in little or no carbon formation with an overall S/C is between 1.8 and 2.0 or higher.

In another embodiment, reactor 101 can be an adiabatic reactor. Reactor 103 can be a convectively heated reactor. Reforming catalyst 102 can be a known high nickel-containing prereforming catalyst. Catalyst 104 can be a known low nickel-containing reforming catalyst. Reactor 101 can operate in a temperature range from 425 to 600° C. and reactor 103 can operate in a temperature range from 425 to 730° C. This combination of reactor and catalyst results in little or no carbon formation with an overall S/C is between 1.5 and 1.8 or higher.

EXAMPLES

Figure 3:
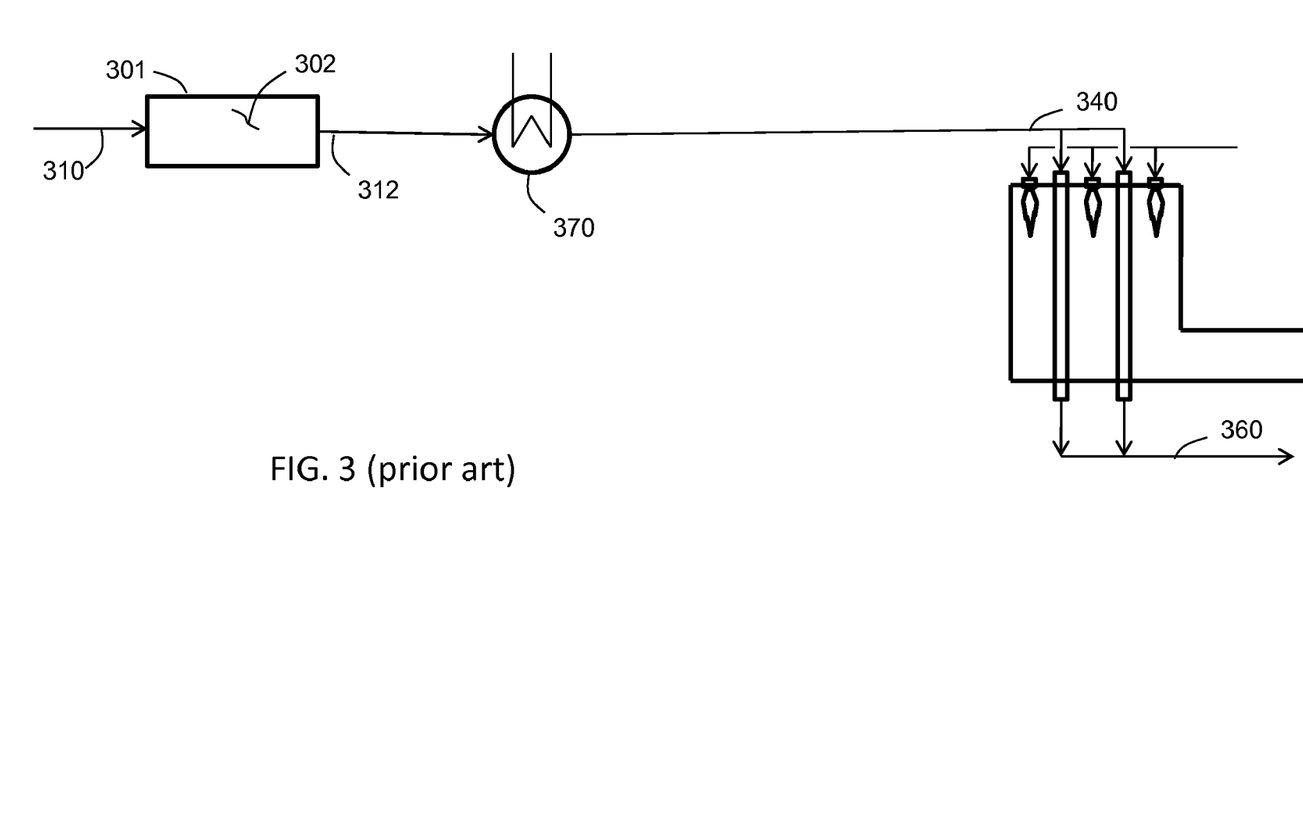
FIG. 3 is a process flow diagram for a prior art process for producing a hydrogen-containing product gas.

The following examples demonstrate that the carbon formation can be avoided using the current process. For all examples, the outlet pressure of reactor preceding plurality of catalyst-containing reformer tubes and the operating pressure of the plurality of catalyst-containing reformer tubes in a top-fired reformer is around 40 atm. The processes shown in FIGS. 1, 2 and 3 are simulated using the commercial Aspen Plus® process simulation software. Reactors 101 and 103 are modeled by the chemical equilibrium simulator in Aspen Plus® (HYSYS Reformer) for the given pressure and a given approach to the chemical equilibrium. In the examples, the mole fraction ratio R is used to judge whether the fired reformer is at the risk of carbon formation. If the mole fraction ratio R of the process stream 40 entering the plurality of catalyst-containing tubes is greater than that calculated from equation (1) for a given steam-to-carbon ratio S/C, the fired reformer is at risk of carbon formation. If R is less that that calculated from Equation (1) for a given S/C, the fired reformer is not at risk of carbon formation.

Example 1

Example 1 corresponds to FIG. 1, where the process stream is heated and subsequently reacted in the second reactor 103. The hydrocarbon used in this example is a typical light natural gas feed consisting of 94.6% $CH_4$, 1.38% $C_2H_6$, 0.19% $C_3H_8$, 1.79% $CO_2$ and 2% $N_2$. The molar flow rates of streams 20, 22 and 24 are zero.

The approach to reforming reaction equilibrium is 2.8° C. for both reactor 101 and reactor 103.

The process is simulated with a steam-to-carbon molar ratio of 2.3. The results of the simulation are summarized in Table 1. Select stream concentrations and operating conditions are shown in Table 1. For the steam-to-carbon molar ratio of 2.3, the mole fraction ratio, R, of the process stream 40 is 1.74. This ratio is smaller than that calculated from Eq. (1), 2.32 for a steam-to-carbon ratio of 2.3. Therefore, the reformer can be operated with a steam-to-carbon molar ratio of 2.3 using this process.

TABLE 1

| | Stream | | | |
| --- | --- | --- | --- | --- |
| Parameter | 10 | 12 | 14 | 40 |
| $H_2$ (mole %) | 0.91 | 7.54 | 7.54 | 12.56 |
| $CH_4$ mole %) | 28.73 | 26.95 | 26.95 | 24.88 |
| $CO_2$ (mole %) | 0.54 | 2.31 | 2.31 | 3.44 |
| $H_2O$ (mole %) | 68.70 | 62.57 | 62.57 | 58.36 |
| Flow rate (kmol/hr) | 7342 | 7621 | 7621 | 7831 |
| Pressure (atm) | 44 | 40 | 39 | 39 |
| Temperature (° C.) | 535 | 467 | 593 | 536 |

Example 2

Example 2 corresponds to FIG. 3, a process with only one reactor 301 (no second reactor) and a heat exchanger 370. The approach to reforming reaction equilibrium in reactor 301 is 2.8° C.

The process is simulated with a steam-to-carbon molar ratio of 2.3. The hydrocarbon used in this example is a typical light natural gas feed consisting of 94.6% $CH_4$, 1.38% $C_2H_6$, 0.19% $C_3H_8$, 1.79% $CO_2$ and 2% $N_2$. The results of the simulation are summarized in Table 2. Stream concentrations and operating conditions are shown in Table 2. For a steam-to-carbon molar ratio of 2.3, the mole fraction ratio, R, of the feed to the fired reformer 340 is 3.1. This ratio is greater than that calculated from Eq. (1), 2.32 for a steam-to-carbon ratio of 2.3. Therefore, the reformer cannot be operated with a steam-to-carbon molar ratio of 2.3 using this process without the risk of carbon formation.

TABLE 2

| | Stream | | |
| --- | --- | --- | --- |
| Parameter | 310 | 312 | 340 |
| $H_2$ (mole %) | 0.91 | 7.54 | 7.54 |
| $CH_4$ mole %) | 28.73 | 26.95 | 26.95 |
| $CO_2$ (mole %) | 0.54 | 2.31 | 2.31 |
| $H_2O$ (mole %) | 68.70 | 62.57 | 62.57 |
| Flow rate (kmol/hr) | 7342 | 7621 | 7621 |
| Pressure (atm) | 44 | 40 | 39 |
| Temperature (° C.) | 535 | 467 | 620 |

Example 3

Example 3 corresponds to FIG. 1, where the process stream is heated and subsequently reacted in the second reactor 103. The molar flow rates of streams 20, 22 and 24 are zero. The approach to reforming reaction equilibrium is 2.8° C. for both reactor 101 and reactor 103.

The process in Example 3 is simulated with a steam-to-carbon molar ratio of 2.0. The hydrocarbon used in this example is a typical light natural gas feed consisting of 94.6% $CH_4$, 1.38% $C_2H_6$, 0.19% $C_3H_8$, 1.79% $CO_2$ and 2% $N_2$. The results of the simulation are summarized in Table 3. Stream concentrations and operating conditions are shown in Table 3. For a steam-to-carbon molar ratio of 2.0, the mole fraction ratio, R, is 1.56. This ratio is smaller than that calculated from Eq. (1), which is 1.67 for a steam-to-carbon ratio of 2.0. Therefore, the reformer can be operated with a steam-to-carbon molar ratio of 2.0 using this process.

TABLE 3

| Parameter | Stream | | | |
|---|---|---|---|---|
| | 10 | 12 | 14 | 40 |
| $H_2$ (mole %) | 1.00 | 7.60 | 7.60 | 14.97 |
| $CH_4$ mole % | 31.56 | 29.76 | 29.76 | 26.58 |
| $CO_2$ (mole %) | 0.60 | 2.37 | 2.37 | 3.96 |
| $H_2O$ (mole %) | 65.62 | 59.58 | 59.58 | 53.52 |
| Flow rate (kmol/hr) | 7117 | 7388 | 7388 | 7695 |
| Pressure (atm) | 44 | 40 | 39 | 39 |
| Temperature (° C.) | 535 | 468 | 649 | 565 |

Example 4

Example 4 corresponds to FIG. 2, where the process stream is heated and reacted simultaneously in the second reactor 103. The molar flow rates of streams 20, 22 and 24 are zero. The approach to reforming reaction equilibrium is 2.8° C. for reactor 101 and 28° C. for reactor 103.

The process is simulated with a steam-to-carbon molar ratio of 1.6. The hydrocarbon used in this example is a typical light natural gas feed consisting of 94.6% $CH_4$, 1.38% $C_2H_6$, 0.19% $C_3H_8$, 1.79% $CO_2$ and 2% $N_2$. The results of the simulation are summarized in Table 4. Stream concentrations and operating conditions are shown in Table 4. For a steam-to-carbon molar ratio of 1.6, the mole fraction ratio, R, is 0.88. This ratio is smaller than that calculated from Eq. (1), 0.99 for a steam-to-carbon ratio of 1.6. Therefore, the reformer can be operated with a steam-to-carbon molar ratio of 1.6 using this process.

Example 5

Example 5 corresponds to FIG. 1, where the process stream is heated and subsequently reacted in the second reactor 103. The molar flow rates of streams 20, 22 and 24 are zero. For this example, the hydrocarbon used is pentane instead of a typical light natural gas.

The approach to reforming reaction equilibrium is 2.8° C. for both reactor 101 and reactor 103.

The process is simulated with a steam-to-carbon molar ratio of 2.3. The results of the simulation are summarized in Table 5. Select stream concentrations and operating conditions are shown in Table 5. For the steam-to-carbon molar ratio of 2.3, the mole fraction ratio, R, of the process stream 40 is 1.59. This ratio is smaller than that calculated from Eq. (1), 2.32 for a steam-to-carbon ratio of 2.3. Therefore, the reformer can be operated with a steam-to-carbon molar ratio of 2.3 using this process.

TABLE 4

| Parameter | Stream | | |
|---|---|---|---|
| | 10 | 12 | 40 |
| $H_2$ (mole %) | 1.15 | 7.68 | 26.24 |
| $CH_4$ mole % | 36.33 | 34.52 | 25.37 |
| $CO_2$ (mole %) | 0.69 | 2.46 | 5.34 |
| $H_2O$ (mole %) | 60.43 | 54.55 | 40.08 |
| Flow rate (kmol/hr) | 6878 | 7143 | 8010 |
| Pressure (atm) | 44 | 40 | 39 |
| Temperature (° C.) | 535 | 471 | 704 |

TABLE 5

| Parameter | Stream | | | |
|---|---|---|---|---|
| | 10 | 12 | 14 | 40 |
| $H_2$ (mole %) | 0.24 | 6.15 | 6.15 | 10.33 |
| $C_5H_{12}$ (mole %) | 7.98 | 0 | 0 | 0 |
| $CH_4$ (mole %) | 0 | 25.16 | 25.16 | 23.43 |
| $CO_2$ (mole %) | 0.00 | 8.05 | 8.05 | 8.72 |
| $H_2O$ (mole %) | 91.77 | 60.48 | 60.48 | 57.07 |
| Flow rate (kmol/hr) | 7044 | 8425 | 8425 | 8624 |
| Pressure (atm) | 44 | 40 | 39 | 39 |
| Temperature (° C.) | 449 | 481 | 593 | 544 |

Although the present invention has been described as to specific embodiments or examples, it is not limited thereto, but may be changed or modified into any of various other forms without departing from the scope of the invention as defined in the accompanying claims.

We claim:

1. A process for producing a hydrogen-containing product gas comprising:
   (a) introducing a process stream comprising steam and at least one hydrocarbon selected from the group consisting of methane, ethane, propane, butane, pentane and hexane into a first reactor containing a first reforming catalyst, the process stream having an initial molar flow rate of steam, $F_s$, and a initial molar flow rate of hydrocarbon-based carbon, $F_C$, the steam being provided in the process stream, in one or more steam-containing streams, or in a combination of the process stream and the one or more steam-containing streams, to provide a steam-to-carbon molar ratio, S/C, of between 1.5 and 2.4;
   (b) introducing the one or more steam-containing streams, when present, into the process stream, the one or more steam-containing streams having a molar flow rate of steam, $W_s$, ranging from greater than 0 to $5F_s$ when the steam-containing stream is present and $W_s$ being 0 when the steam-containing stream is not present, and having a molar flow rate of methane-based carbon, $W_C$, ranging from greater than 0 to $1F_c$ when the steam-containing stream is present and $W_c$ being 0 when the steam-containing stream is not present to provide the steam-to-carbon molar ratio, S/C, where $$\frac{S}{C} = \frac{F_s + W_s}{F_C + W_C}$$

(c) reacting the at least one hydrocarbon and steam in the process stream in the presence of the first reforming catalyst under adiabatic conditions at a first temperature ranging from 425° C. to 600° C. and a first pressure ranging from 5 to 55 atmospheres to form reaction products comprising hydrogen and carbon dioxide in the process stream;
(d) heating the process stream to a second temperature ranging from 425° C. to 730° C.;
(e) reacting methane and steam in the process stream in the presence of a second reforming catalyst in a second reactor at the second temperature ranging from 425° C. to 730° C. and a second pressure ranging from 4 to 55 atmospheres to form additional reaction products comprising hydrogen and carbon dioxide in the process stream;
(f) withdrawing the process stream from the second reactor at an exit temperature ranging from 510° C. to 730° C.;
(g) subsequent to withdrawing the process stream from the second reactor, introducing the process stream comprising methane and steam into a plurality of catalyst-containing reformer tubes in a reformer furnace having a ceiling, a floor and side walls, and reacting methane and steam in the process stream inside the plurality of catalyst-containing reformer tubes at a third temperature ranging from 500° C. to 1000° C. and a third pressure ranging from 2 to 50 atmospheres to form the hydrogen-containing product gas; and
(h) combusting a fuel gas in the reformer furnace external to the plurality of catalyst-containing reformer tubes by introducing the fuel gas and an oxidant gas through burners mounted in the ceiling of the reformer furnace to supply energy for reacting methane and steam inside the plurality of catalyst-containing reformer tubes, and withdrawing a flue gas from the reformer furnace.

2. The process of claim 1 wherein the burners are mounted only in the ceiling of the reformer furnace to generate flames in a direction co-current with the process stream in the plurality of catalyst-containing reformer tubes.

3. The process of claim 1 wherein the reacting step (e) is subsequent to the heating step (d).

4. The process of claim 1 wherein the reacting step (e) is simultaneous with the heating step (d).

5. The process of claim 1 wherein the temperature of the process stream exiting the second reactor ranges from 510° C. to 640°, the process further comprising:
heating the process stream by at least 10° C. to an inlet temperature ranging from 560° C. to 650° C. prior to introducing the process stream comprising methane and steam into the plurality of catalyst-containing reformer tubes.

6. The process of claim 1 wherein the first reforming catalyst comprises 30 weight % to 50 weight % of at least one metal selected from a group consisting of nickel, cobalt, and mixtures thereof and a first support comprising 50 weight % to 70 weight % of at least one of alumina and calcium aluminate, the first reforming catalyst being promoted by potassium.

7. The process of claim 6 wherein the first reforming catalyst comprises 0.5 weight % to 3 weight % potassium.

8. The process of claim 6 wherein the first support is a structured support.

9. The process of claim 1 wherein the second reforming catalyst comprises 10 weight % to 20 weight % of at least one metal selected from a group consisting of nickel, cobalt, and mixtures thereof and a second support.

10. The process of claim 9 wherein the second support is a refractory support comprising at least one of alumina, calcium aluminate, and magnesium aluminate.

11. The process of claim 10 wherein the second support is a structured support.

12. The process of claim 9 wherein the second reforming catalyst is promoted by potassium.

13. The process of claim 1 wherein the second reforming catalyst is the same as the first reforming catalyst.

14. The process of claim 1 wherein the process stream has a mole fraction ratio, R, that satisfies the following equation:

$$R < 0.327 * \left(\frac{S}{C}\right)^{2.354}.$$

15. The process of claim 1 wherein S/C is between 2.0 and 2.2.

16. The process of claim 15 wherein the first reforming catalyst and the second first reforming catalyst comprise 30 weight % to 50 weight % of at least one metal selected from a group consisting of nickel, cobalt, and mixtures thereof and the reacting step (e) is subsequent to the heating step (d).

17. The process of claim 1 wherein S/C is between 1.8 and 2.0.

18. The process of claim 17 wherein the first reforming catalyst comprises 30 weight % to 50 weight % of at least one metal selected from a group consisting of nickel, cobalt, and mixtures thereof, the second reforming catalyst comprises 10 weight % to 20 weight % of at least one metal selected from a group consisting of nickel, cobalt, and mixtures thereof, and the reacting step (e) is subsequent to the heating step (d).

19. The process of claim 1 wherein S/C is between 1.5 and 1.8.

20. The process of claim 19 wherein the first reforming catalyst comprises 30 weight % to 50 weight % of at least one metal selected from a group consisting of nickel, cobalt, and mixtures thereof, and the second first reforming catalyst comprises 10 weight % to 20 weight % of at least one metal selected from a group consisting of nickel, cobalt, and mixtures thereof and the reacting step (e) is simultaneous with the heating step (d).

* * * * *